(12) United States Patent
Battin et al.

(10) Patent No.: US 7,165,112 B2
(45) Date of Patent: Jan. 16, 2007

(54) METHOD AND APPARATUS FOR TRANSMITTING DATA IN A COMMUNICATION SYSTEM

(75) Inventors: Robert D. Battin, Kildeer, IL (US); Rajeev Ranjan, Buffalo Grove, IL (US); Stephen L. Spear, Skokie, IL (US)

(73) Assignee: Motorola, Inc., Schaumburg, IL (US)

( * ) Notice: Subject to any disclaimer, the term of this patent is extended or adjusted under 35 U.S.C. 154(b) by 933 days.

(21) Appl. No.: 09/887,831

(22) Filed: Jun. 22, 2001

(65) Prior Publication Data

US 2002/0199019 A1   Dec. 26, 2002

(51) Int. Cl.
G00F 15/16    (2006.01)
(52) U.S. Cl. .................................................... 709/230
(58) Field of Classification Search ................ 709/217, 709/218, 230, 231, 232, 245, 236, 237, 238, 709/239; 379/90.02, 93.24, 93.31
See application file for complete search history.

(56) References Cited

U.S. PATENT DOCUMENTS

| | | | | |
|---|---|---|---|---|
| 5,446,736 A | * | 8/1995 | Gleeson et al. | 370/473 |
| 5,619,650 A | * | 4/1997 | Bach et al. | 709/246 |
| 5,627,829 A | * | 5/1997 | Gleeson et al. | 370/349 |
| 5,867,661 A | * | 2/1999 | Bittinger et al. | 709/227 |
| 5,915,087 A | * | 6/1999 | Hammond et al. | 726/12 |
| 6,003,089 A | * | 12/1999 | Housel et al. | 709/229 |
| 6,118,765 A | * | 9/2000 | Phillips | 370/401 |
| 6,160,804 A | * | 12/2000 | Ahmed et al. | 370/349 |
| 6,356,529 B1 | * | 3/2002 | Zarom | 709/230 |
| 6,377,996 B1 | * | 4/2002 | Lumelsky et al. | 709/231 |
| 6,434,133 B1 | * | 8/2002 | Hamalainen | 370/338 |
| 6,487,184 B1 | * | 11/2002 | Pecen et al. | 370/329 |
| 6,512,747 B1 | * | 1/2003 | Umeuchi et al. | 370/310.1 |
| 6,529,527 B1 | * | 3/2003 | Chen et al. | 370/503 |
| 6,553,006 B1 | * | 4/2003 | Kalliokulju et al. | 370/310 |

(Continued)

OTHER PUBLICATIONS

Internetworking Technologies Handbook, Cisco Press, 2001, ISBN 1-58705-001-3.*

(Continued)

*Primary Examiner*—Jason Cardone
*Assistant Examiner*—Ajay M. Bhatia

(57) ABSTRACT

A communication system distributes the functions of a socket abstraction layer of the prior art between a socket abstraction layer included in an client communication device, such as a mobile subscriber, and a socket abstraction layer in a an agent communication device, such as an infrastructure serving the mobile subscriber. By so distributing the functions of the socket abstraction layer, headers may be reduced in signaling between the client communication device and the corresponding agent communication device as part of call set ups and tear downs and in the exchange of payloads between the client and agent communication devices. By reducing the required headers, overhead is reduced and bandwidth is conserved in communications between the client and agent communication devices, such as in over-the-air communications between a mobile subscriber and an infrastructure serving the mobile subscriber, with resulting increases in system capacity and improvements in system efficiency.

20 Claims, 12 Drawing Sheets

U.S. PATENT DOCUMENTS

| | | | |
|---|---|---|---|
| 6,590,905 B1* | 7/2003 | Suumaki et al. | 370/466 |
| 6,609,224 B1* | 8/2003 | Jonsson | 714/758 |
| 6,615,269 B1* | 9/2003 | Suumaki et al. | 709/230 |
| 6,658,011 B1* | 12/2003 | Sevanto et al. | 370/401 |
| 6,716,102 B1* | 4/2004 | Whitten et al. | 463/43 |
| 6,791,945 B1* | 9/2004 | Levenson et al. | 370/235 |
| 6,820,117 B1* | 11/2004 | Johnson | 709/223 |
| 6,970,476 B1* | 11/2005 | Jonsson et al. | 370/401 |
| 2001/0007137 A1* | 7/2001 | Suumaki et al. | 714/18 |
| 2001/0043577 A1* | 11/2001 | Barany et al. | 370/328 |
| 2001/0055298 A1* | 12/2001 | Baker et al. | 370/349 |
| 2002/0064164 A1* | 5/2002 | Barany et al. | 370/401 |
| 2002/0091860 A1* | 7/2002 | Kalliokulju et al. | 709/247 |
| 2002/0163908 A1* | 11/2002 | Lakaniemi et al. | 370/350 |
| 2002/0187789 A1* | 12/2002 | Diachina et al. | 455/452 |
| 2002/0191556 A1* | 12/2002 | Krishnarajah et al. | 370/329 |
| 2003/0081592 A1* | 5/2003 | Krishnarajah et al. | 370/352 |
| 2003/0189900 A1* | 10/2003 | Barany et al. | 370/412 |
| 2004/0010609 A1* | 1/2004 | Vilander et al. | 709/230 |
| 2004/0264433 A1* | 12/2004 | Melpignano | 370/349 |

OTHER PUBLICATIONS

Layer 2 and Layer 3 of UTRA-TDD, By Christina GeBner, Reinhard Kohn, Jorg Schniedenharn, Armin Sitte, 0-7803-5718-3/00 Siemens, AG, 2000.*

UTRA TDD Protocol Operation By Christina GeBner, Reinhard Kohn, Jorg Schniedenharn, Armin Sitte, 0-7803-6465-5/00 Siemens, AG, 2000.*

AIXlink/X.25 Version 2.1 for AIX: Guide and Reference Processing Calls with the X.25 API Unknown Date, Unknown Author.*

Improving TCP/IP Performance over Wireless Networks, Hari Balakrishnam, Srinivasan Seshan, Elan Amir and Rand H. Katz, Mobicom 1995.*

Wireless TCP Performance with Link Layer FEC/ARQ, A. Chockalingam, Michele Zorzi, and Veli Talli, IEEE 1999.*

Performance of TCP/RLP Protocol Stack on Correlated Fading DS-CDMA Wireless Links, A. Chockalingam and Gang Bao.*

RObust Checksum-based header COmpression (ROCCO), Lars-Erik Jonsson, Nov. 9, 1999.*

Multi-Layer Tracing of TCP over a Reliable Wireless Link, Reiner Ludwig, et al., ACM 1999.*

Effects of Interleaving on RTP Header Compression, IEEE 2000.*

Low-loss TCP/IP Header COmpression for Wireless Networks, Mikael Degermark et al., Mobicom 1996.*

Yemini, Y. et al., "Isochronets: a high-speed network switching architecture", Distributed Comput. & Commun. Lab., Columbia Univ., New York, NY: INFOCOM '93. Proceedings. Twelfth Annual Joint Conference of the IEEE Computer and Communications Societies. Networking: Foundation for the Future. IEEE Meeting Date: Mar. 28, 1993-94/01/1993, pp. 740-747, vol. 2.

* cited by examiner

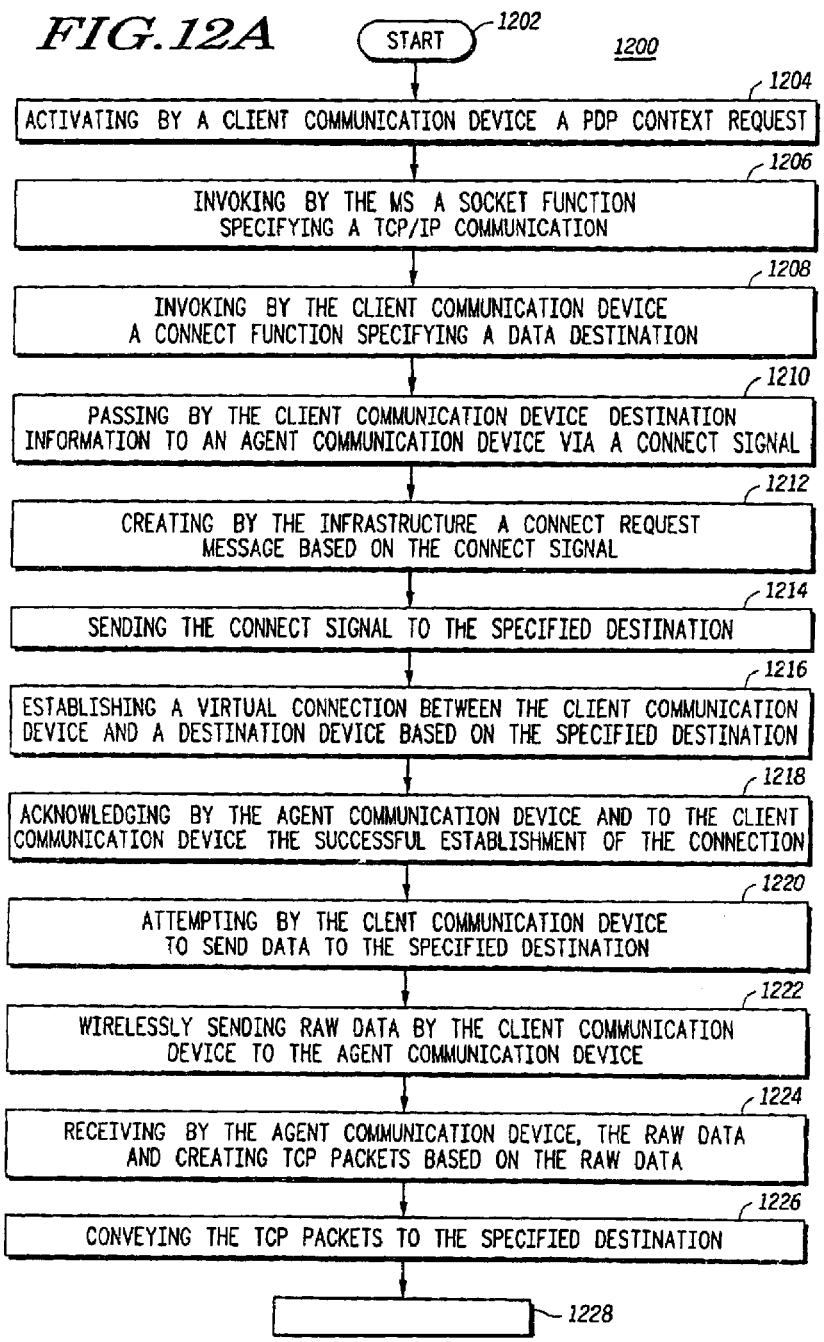

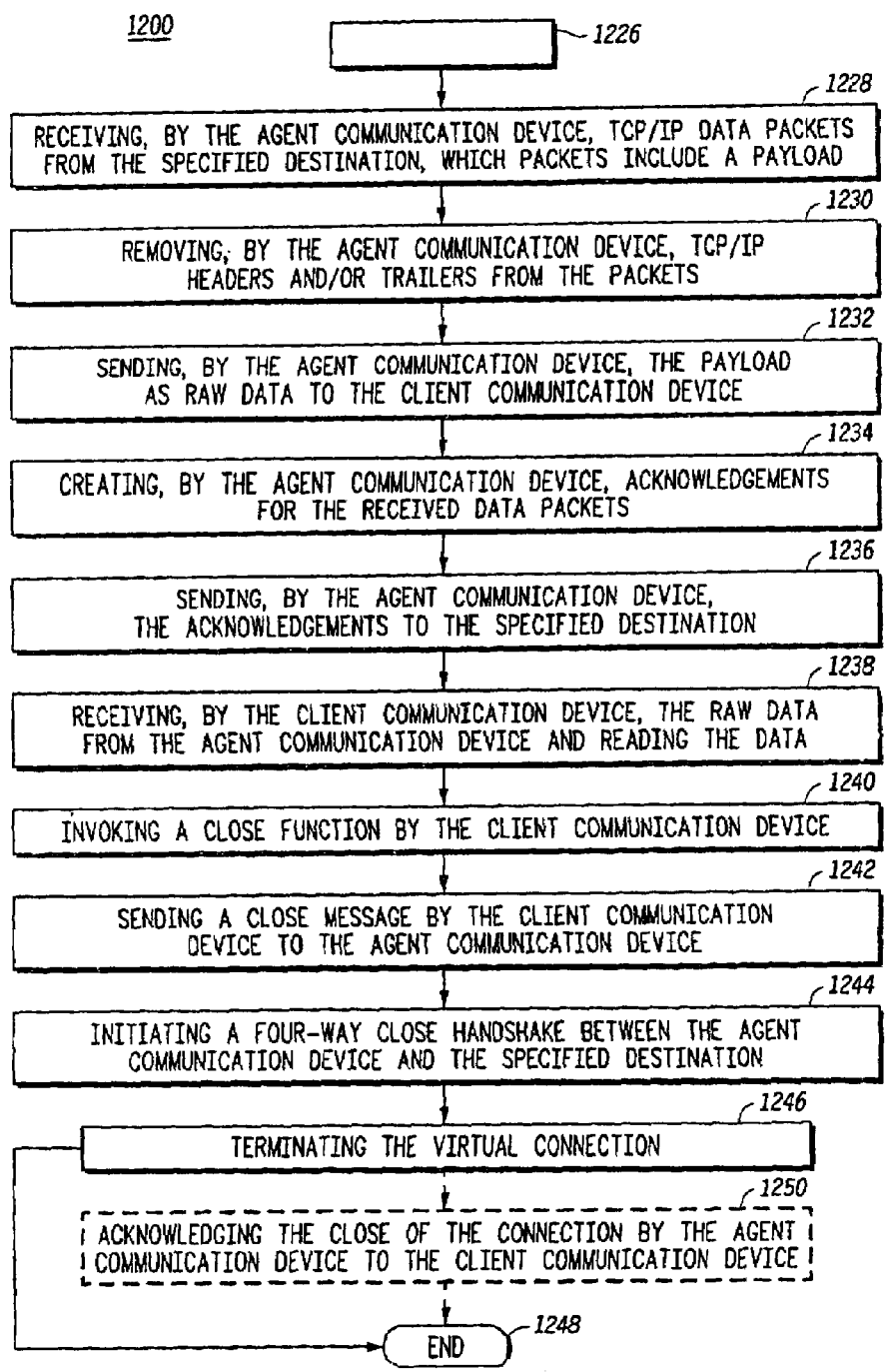

METHOD AND APPARATUS FOR TRANSMITTING DATA IN A COMMUNICATION SYSTEM

FIELD OF THE INVENTION

The present invention relates generally to cellular communication systems, and, in particular, to data transmission protocols in a cellular communication system.

BACKGROUND OF THE INVENTION

Cellular communication systems are well known and consist of many types, including land mobile radio, cellular radiotelephone, and personal communication systems. With each communication system, data is transmitted between a transmitting communication device and a receiving communication device via a communication resource that includes a communication channel that operates over a physical resource, typically a frequency bandwidth. Typically, the data, or payload, is compiled into a data packet that includes a header and/or a trailer. The header and trailer include information that is used by the system to process the data, and may include information such as a source and a destination of the data, a packet number corresponding to a sequence of packets, a requested quality of service, a payload length, and other data processing related information.

In order to facilitate an exchange of data among multiple components of a cellular communication system, understandings known as protocols have been developed. The protocols specify the manner of interpreting each data bit of a data packet exchanged across the network. In order to simplify network designs, several well-known techniques of layering the protocols have been developed. Protocol layering divides the network design into functional layers and then assigns separate protocols to perform each layer's task. By using protocol layering, the protocols are kept simple, each with a few well-defined tasks. The protocols can then be assembled into a useful whole, and individual individual protocols can be removed or replaced as needed. Layered representation of protocols is commonly known as a protocol stack. A protocol stack commonly used for the interconnection of network systems is TCP/IP (Transmission Control Protocol/Internet Protocol) Suite, named for two of the protocols used in the stack. The TCP/IP protocol stack includes both TCP and UDP (User Datagram Protocol) as possible transport layer protocols.

Known within the art is the concept of Application Programming Interface (API). An API is used to present a standardized interface to a given protocol layer for services available to a higher level protocol layer or application. The API typically is documented a set of function calls. Within the TCP/IP Suite the well known API is called the Socket Abstraction Layer or just the sockets interface.

Also known within the art is the concept of a Socket. A socket is the combination of an IP Address and port number. A socket is unique to a transport protocol. For instance the TCP socket X is distinct from the UDP socket X. A pair of IP Addresses and port numbers is called a socket pair. Socket pairs are typically used to provide two-way communication between applications on two IP hosts. A socket is identified to the application through a socket descriptor.

The TCP/IP protocol stack typically includes five layers, from highest to lowest, an application layer, a transport layer, a network layer, a link layer, and a physical layer. Each layer in a transmitting communication device typically attaches a header and/or trailer to the payload that instructs a corresponding layer in a receiving communication device or an intervening system component. The higher layer headers are typically encapsulated within the lower layer headers. However, the addition of headers to a data packet consumes system bandwidth. System bandwidth is limited and the headers included in data packets impose constraints upon bandwidth utilization and system capacity.

Known within the art are several header compression mechanisms (RFC 2507, RFC2508, etc) that compress one or more of the protocol layer headers at one side of a logical link to create a compressed header. After transmitting the payload and compressed header across the logical link, the compressed header is then to reveal the original header. These methods work on known protocol headers such as TCP, UDP, and IP. However, even with the compressed header, the bandwidth consumed by these compressed headers imposes constraints upon bandwidth utilization and system capacity.

Therefore, a need exists for a method and an apparatus for eliminating the need to send protocol headers, compressed or uncompressed, across a communication link for the majority of tranmissions, thereby increasing the throughput of a communication channel and the capacity of a communication system.

BRIEF DESCRIPTION OF THE DRAWINGS

FIG. 12A is a logic flow diagram of the steps executed by the communication system of FIG. 1 in order to engage in a data communication in accordance with another embodiment of the present invention.

FIG. 12B is a continuation of FIG. 12A and is a logic flow diagram of the steps executed by the communication system of FIG. 1 in order to engage in a data communication in accordance with another embodiment of the present invention.

DETAILED DESCRIPTION OF THE INVENTION

Figure 1:
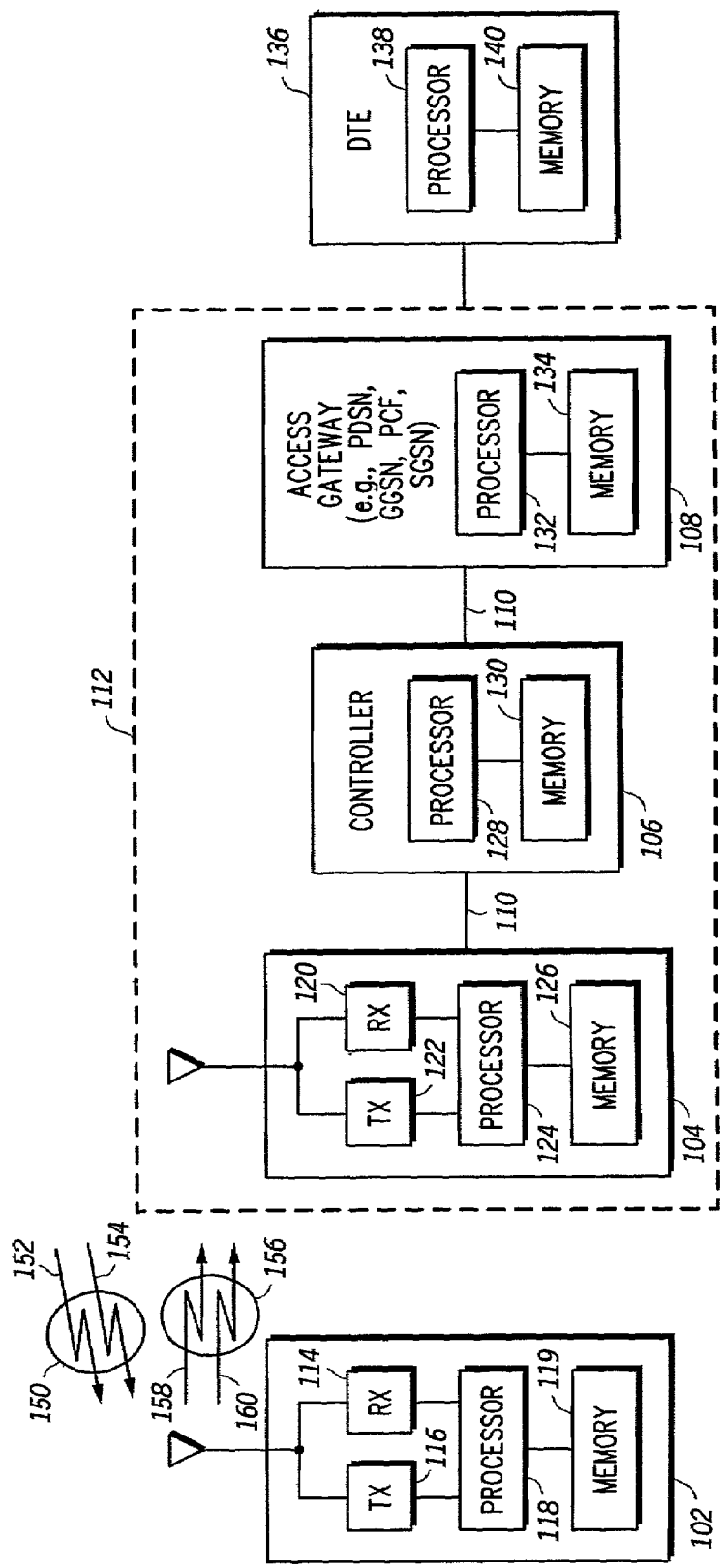
FIG. 1 is a block diagram of a wireless communication system 100 in accordance with an embodiment of the present invention.

To address the need for a method and an apparatus eliminating the protocol headers and/or trailers included in a transmission of a data packet, thereby increasing the throughput of a communication channel and the capacity of a communication system, a communication system distributes the functions of a socket abstraction layer of the prior art between a socket abstraction layer included in a client communication device, such as a mobile subscriber, and a socket abstraction layer in an agent communication device, such as an infrastructure serving the mobile subscriber. By so distributing the functions of the socket abstraction layer, headers may be reduced in signaling between the client communication device and the corresponding agent communication device as part of call set ups and tear downs and in the exchange of payloads between the client and agent communication devices. By reducing the required headers, overhead is reduced and bandwidth is conserved in communications between the client and agent communication devices. Such as in over-the-air communications between a mobile subscriber and an infrastructure serving the mobile subscriber, with resulting increases in system capacity and improvement sin system efficiency.

Generally, an embodiment of the present invention encompasses a method for transmitting data by a first communication device. The method includes steps of receiving, from a second communication device, a message that comprises socket information and that requests an establishment of a connection based on the socket information, and wherein the socket information comprises destination information, translating the message requesting an establishment of a virtual connection to a connection request, and routing the connection request to the destination identified by the socket information. The method further includes steps of establishing a virtual connection based on the connection request, receiving, from the second communication device, a data packet that comprises a payload, generating a header, adding the header to the payload to produce a modified data packet, and routing the modified data packet to the identified destination.

Another embodiment of the present invention encompasses a method for transmitting data by a first communication device. The method includes steps of producing a message requesting an establishment of a connection with a destination identified by socket information, wherein the socket information comprises destination information and routing the message to a second communication device. The method further includes steps of producing a reduced-size header data packet that comprises a payload and does not include at least a portion of the socket information and routing the reduced-size header data packet to the second communication device, wherein the second communication device adds a header to the reduced-size data packet that includes missing socket information.

Still another embodiment of the present invention encompasses a method for transmitting data. The method comprises steps of generating, by a first communication device, a message requesting an establishment of a connection with a destination identified by socket information, wherein the socket information comprises destination information and routing, by the first communication device to a second communication device, the message. The method further comprises steps of receiving, by the second communication device, the message, translating, by the second communication device, the message requesting an establishment of a virtual connection to a connection request, routing, by the second communication device, the connection request to the destination identified by the socket information and establishing a virtual connection based on the connection request. The method further comprises steps of generating, by the first communication device, a first reduced-size header data packet that comprises a first payload and does not include at least a portion of the socket information, routing, by the first communication device to the second communication device, the first reduced-size header data packet, and receiving, by the second communication device, the first reduced-size header data packet. The method further comprises steps of generating, by the second communication device, a header that includes the missing socket information, adding, by the second communication device, the header that includes the missing socket information to the payload to produce a modified data packet, and routing, by the second communication device, the modified data packet to the identified destination.

Yet another embodiment of the present invention encompasses a communication device capable of operating in a fixed infrastructure of a wireless communication system, the communication device having a processor capable of receiving a message from a different communication device, wherein the message comprises socket information and requests an establishment of a connection based on the socket information, and wherein the socket information comprises destination information. The processor is further capable of translating the message requesting an establishment of a virtual connection to a connection request and routing the connection request to the destination identified by the socket information, wherein a virtual connection is established based on the connection request. The processor is further capable of receiving, from the different communication device, a data packet that comprises a payload, generating a header, adding the header to the payload to produce a modified data packet, and routing the modified data packet to the identified destination.

Yet another embodiment of the present invention encompasses a communication device capable of operating in a fixed infrastructure of a communication system, the communication device having a processor capable of generating a message that includes socket information and that requests an establishment of a connection with a destination identified by a socket information, transmitting the message, and generating a data packet that comprises a payload and that further comprises a reduced-sized header that is missing at least a portion of the socket information.

Yet another embodiment of the present invention encompasses a communication system including a first communication device and a second communication device. The first communication device includes a first socket abstraction layer capable of invoking function calls and sending interprocess communication (IPC) messages. The second communication device includes a second socket abstraction layer capable of generating headers that are not generated by the first socket abstraction layer. The first socket abstraction layer is capable of communicating with the second socket abstraction layer via IPC messages, and the first communication device conveys data packets to the second communication device minus headers that are appended to the data packet by the second communication device.

Yet another embodiment of the present invention encompasses a communication system that includes a first communication device, a second communication device, and a third communication device. The first communication device includes a first socket abstraction layer, generates data packet that comprises a payload and a header, and routes the data packet to the second communication device. The second communication device includes a second socket abstraction layer, receives the data packet, terminates at least a portion of the header that is generated by the first communication device to produce a reduced-size data packet, and routes the reduced-size data packet to the third communication device. The third communication device includes a third socket abstraction layer, receives the reduced-size data packet, and generates at least a portion of the at least a portion of the header that is terminated by the second communication device. The second socket abstraction layer is capable of communicating with the third socket abstraction layer via interprocess communication (IPC) messages.

The present invention may be more fully described with reference to FIGS. 1–12B. FIG. 1 is a block diagram of a wireless communication system 100 in accordance with an embodiment of the present invention. Communication system 100 includes at least one mobile station (MS) 102 and a base station 104 that provides communications services to the MS. Base station 104 is in turn coupled to a communication system controller 106, typically one or more base station controllers or centralized base station controllers (RNC/BSC/CBSC), that controls communication between and manages the operation and interaction of multiple base stations. In turn, controller 106 is coupled to an Access Gateway 108, preferably a Wireless Gateway, for routing packets. For example, Access Gateway 108 may be a Gateway GPRS Support Node (GGSN), a Packet Data Service Node (PDSN), a Packet Control Function (PCF), a Packet Control Unit (PCU), a Serving GPRS Support Node (SGSN), or any of a variety of data routers. The components 104, 106, and 108 of communication system 100 are linked together by a network 110. Together, base station 104, controller 106, Access Gateway 108, and network 110 are collectively referred to as a fixed communication infrastructure 112. Data terminal equipment (DTE) 136, such as a personal computer, workstation, or server connected to infrastructure 112, is connected to infrastructure 112.

Each of MS 102 and base station 104 includes a respective receiver 114, 120 and transmitter 116, 122 that are each in communication with a processor 118, 124. Each of MS 102 and base station 104 further includes a respective memory 119, 126 associated with the processor that stores programs and applications that are executed by the processor and permit the functioning of the communication device. Each of controller 106, Access Gateway 108, and DTE 136 includes a respective processor 128, 132, and 138 and a respective associated memory 130, 132, and 140 that stores programs and applications that are executed by the processor and permits the functioning of the RNC, Access Gateway, and DTE. Each of MS 102 and the communication devices included in infrastructure 112, that is, base station 104, controller 106, and Access Gateway 108, are capable of functioning as a transmitting communication device or a receiving communication device in system 100.

Communication devices 102 and 104 are each preferably capable of operating in a wireless communication system. Communication system 100 includes a forward link 150 and a reverse link 156 that each includes multiple communication channels 152, 154, 158, 160 (two shown for each link). Typically, the multiple communication channels include a pilot channel, multiple paging channels, and multiple traffic channels. Communication system 100 is a packet data communication system, and may use any one of a variety of data modulation schemes that are used to transmit packet data over the multiple communication channels. For example, communication system 100 may be a Code Division Multiple Access (CDMA) communication system in which a communication channel comprises an orthogonal code that is used to cover transmitted data, or a Time Division Multiple Access (TDMA) or Global System for Mobile communication (GSM) communication system in which a communication channel comprises a time slot, or a Frequency Division Multiple Access (FDMA) or Orthogonal Frequency Division Multiple Access (OFDM) communication system in which a communication channel comprises a frequency bandwidth. As those who are of ordinary skill in the art realize, the type of communication system used herein is not critical to the present invention, and communication system 100 may be any packet data communication system without departing from the spirit and scope of the present invention.

When information is received by a communication device 102, 104, the information is demodulated and digitized, if not already in a digital format, and processed by one or more tasks performed by respective processors 118, 124. The digitized data is then routed by the processor to a softy,are application, or process, running in the processor. To facilitate a processing of the digitized data and a routing of the data to one of multiple potential destinations, such as an application running in a processor, the data is routed pursuant to a routing scheme.

At the level of interconnected networks systems, such as system 100, understandings known as protocols have been developed for the exchange of data among multiple users of the networks. The protocols specify the manner of interpreting every data bit of a data packet exchanged across the networks. In order to simplify network designs, several well-known techniques of layering the protocols have been developed. Protocol layering divides the network design into functional layers and then assigns separate protocols to perform each layer's task. By using protocol layering, the protocols are kept simple, each with a few well-defined tasks. The protocols can then be assembled into a useful whole, and individual protocols can be removed or replaced as needed.

A layered representation of protocols is commonly known as a protocol stack. One protocol stack commonly used for the interconnection of network systems is the TCP/IP Suite, named for two of the protocols, Transmission Control Protocol (TCP) and Internet Protocol (IP), in the stack. The TCP/IP protocol stack includes five layers, which layers are, from highest to lowest, an application layer, a transport layer, a network layer, and a link layer, and a physical layer.

The bottom layer in the TCP/IP protocol stack, that is, the physical layer, includes the network hardware and a physical medium for the transportation of data. The next layer up is the link layer or data-link layer, which provides an interface to network hardware and includes a link driver that implements portions of the link layer. The next layer up from the link layer is the network layer, which layer is responsible for delivering data across a series of different physical networks that interconnect a source of the data and a destination for the data. Routing protocols, such as the IP protocol, are included in the internetwork layer, and a message routed from one IP host to another IP host is known as an EP datagram. An IP datagram includes an IP header containing information for the IP protocol and data for the higher level protocols. Included in the IP header is a Protocol Identification field and IP address for each of a source of the datagram and a destination of the datagram. An IP address uniquely identifies an interface that is capable of sending and receiving an IP datagram and is described in detail in Request For Comments (RFC) 1166, a publication of the Internet Engineering Taskforce (IETF). The IP Protocol is defined in detail in RFC 791.

The next layer up from the internetwork layer is the transport layer. The transport layer provides end-to-end data flow management across interconnected network systems, such as connection rendezvous and flow control. Typically, the transport layer includes one of two transport protocols, TCP and UDP (User Datagram Protocol), that each provides a mechanism for delivering an IP datagram to a specified port. TCP is an Internet standard protocol with a standard (STD) number 7 and is described in detail in RFC 793. UDP is an Internet standard protocol with an STD number 6 and is described in detail in RFC 768. A system using the UDP protocol to deliver an IP datagram includes a UDP header that includes a source port number, a destination port number, a length of datagram number, and a checksum. Above the transport layer is the application layer, which layer contains protocols that implement user-level applications, such as file transfer and mail delivery.

The interface between the transport layer and the application layer is defined by an API. The socket abstraction layer is the most widely known example of this API. A socket provides a means by which an application running in an application layer on one communication device may communicate via the network protocol stack with another application running in an application layer on another communication device. A port is a number, preferably a 16-bit number, that is used by a transport protocol to identify a higher level protocol or application (process) to which the transport protocol must deliver an incoming Protocol Data Unit (PDU). A TCP socket is composed of the port number of the application (process) and the IP address of the associated communication device, and as such acts as the endpoint of a connection or request for network services. An application program (process) can send and receive TCP/IP messages by opening a socket and reading and writing data to and from the particular socket.

Figure 2:
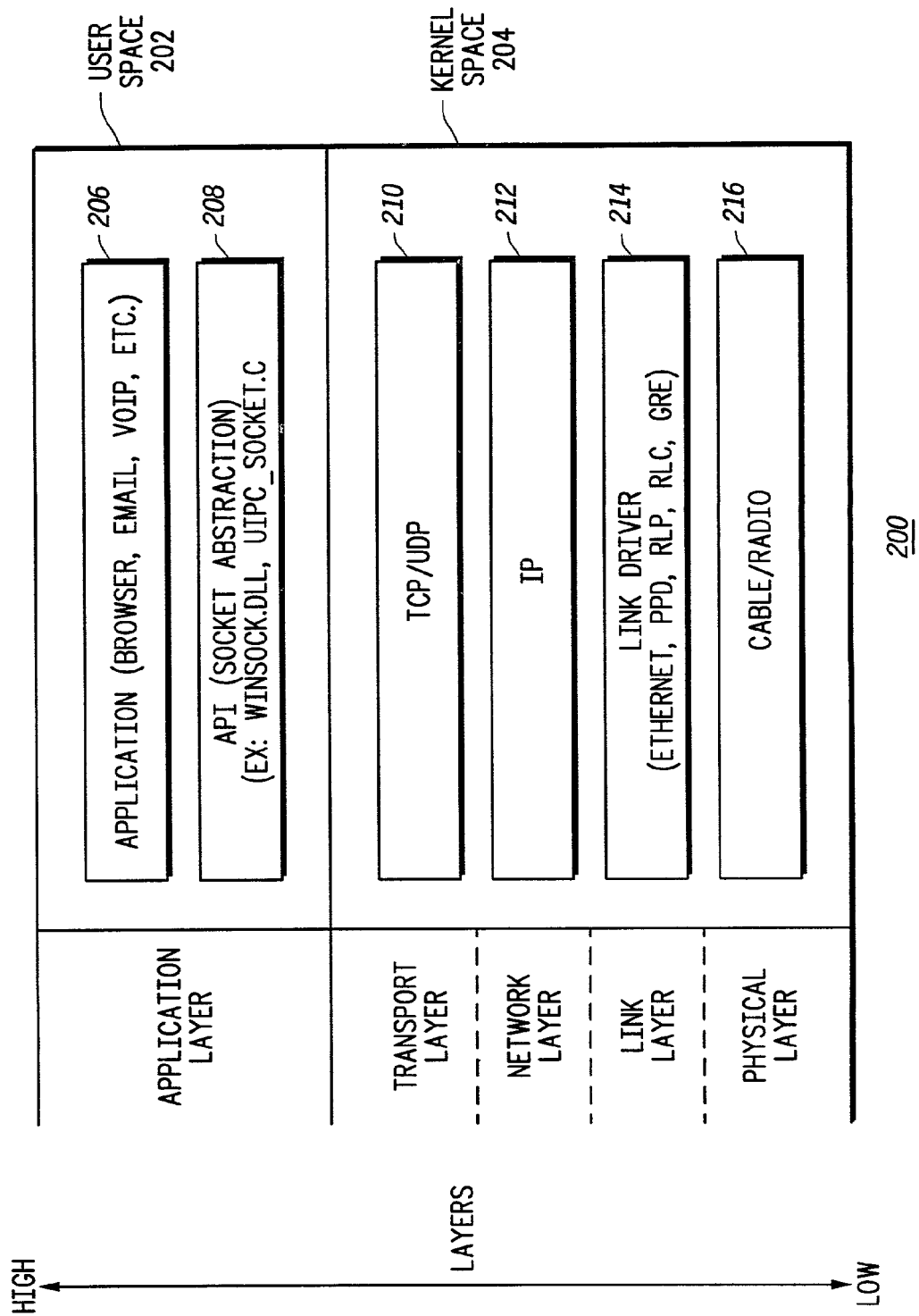
FIG. 2 is a block diagram of a typical protocol stack 200 of the prior art.

FIG. 2 is a block diagram of a typical protocol stack 200 of the prior art. As depicted in FIG. 2, the protocol stack includes an application layer 202, or User Space, and lower layers 204, or Kernel Space. Included in application layer 202 are multiple applications 206 (one shown), and a software application interface (API) 208. Lower layers 204 include the remaining portions of the TCP/IP protocol stack, namely the transport layer 210, the network layer 212, the link layer 214, and the physical layer 216, which layers are collectively referred to herein as a primary network stack. The protocol stack is typically implemented in a processor, such as processors 118 and 124, of a communication device.

A software application interface (API) 208 provides an interface between the application layer 202 and the lower layers 204. A well-known API is a socket abstraction. The socket abstraction provides a familiar file input/output interface to the network stack for application use. A socket abstraction layer is included in most microprocessor-based operating systems. For example, the socket abstraction is implemented within Winsock.DLL in Microsoft-based operating systems and within kern/uipc_socket.c in UNIX-based operating systems.

Figure 3:
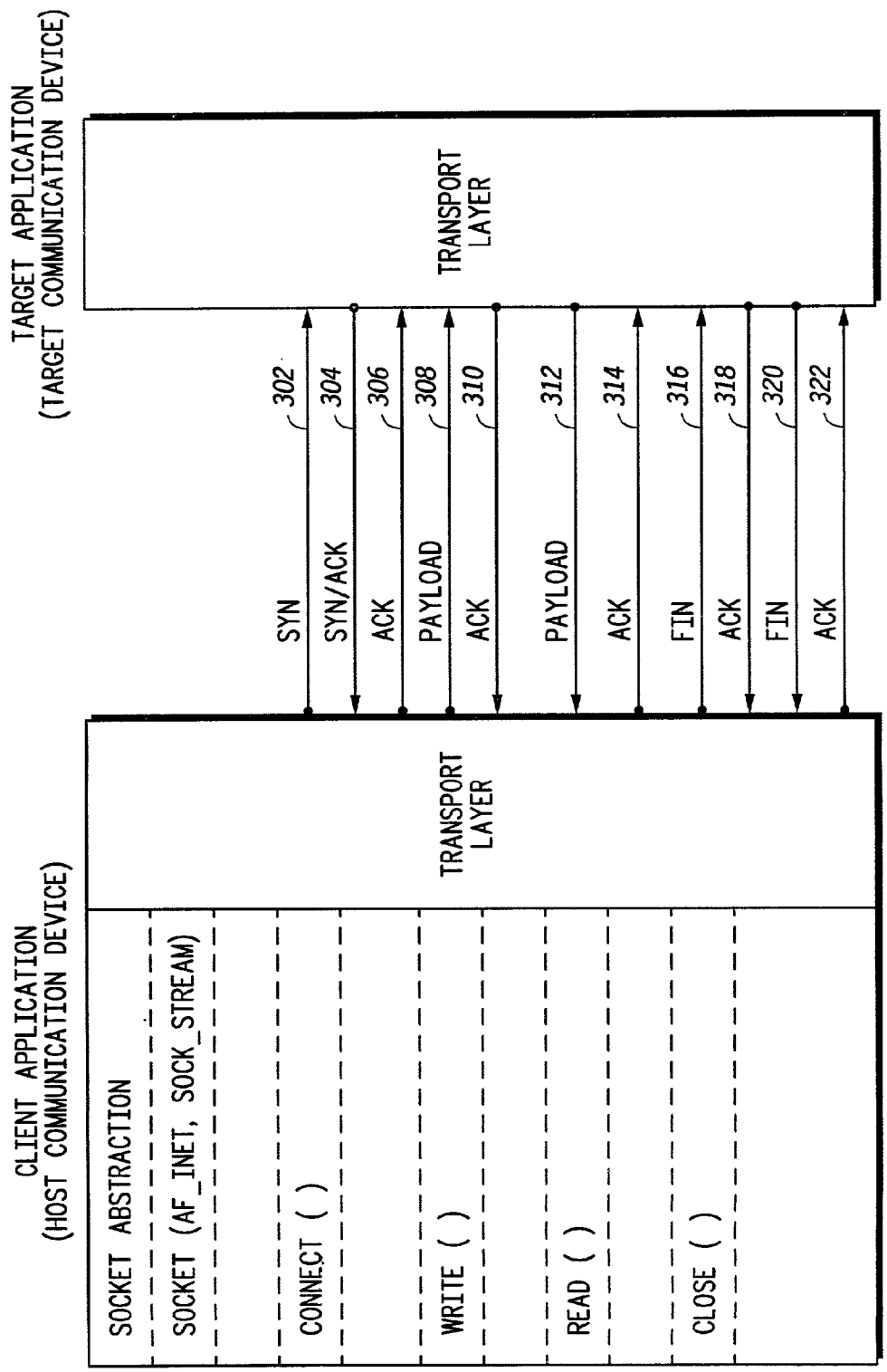
FIG. 3 is a signal flow diagram corresponding to a TCP/IP-based data packet communication of the prior art.

FIG. 3 is a signal flow diagram 300 corresponding to a TCP/IP-based data packet communication of the prior art. As depicted in FIG. 3, a virtual connection is established between a client application running on a host communication device and a target application running on a target communication device by execution of a socket function call and a connect function call. The connect function call initiates a three way handshake (steps 302, 304, and 306). Socket abstraction layer 210 establishes a socket for use by the host application and provides the application a socket descriptor. In step 302, a protocol stack running in the host communication device sends connection request, that is, a SYN ("synchronize," or "set up") signal, to the target hosts protocol stack. In step 304, the target communication device accepts the connection request by acknowledging the SYN signal and sending a connection request to the host communication device. In step 306, the host communication device acknowledges receiving the connection request from the target communication device and a virtual connection is established. Each of the connection requests and acknowledgements includes TCP/IP headers consisting of 40 or more bytes of protocol overhead. After the virtual connection is established, the connection is identified by each of the host communication device and the target communication device by the socket pair, or IP addresses and port numbers, associated with the connection. The application is provided a socket descriptor to identify the socket pair.

By establishing the virtual connection, the host communication device can send payload packets to the target communication device (steps 308, 310) and receive payload packets from the target communication device (steps 312, 314). The payload packets each includes TCP/IP headers and/or trailers that consume bandwidth, or system overhead. The host communication device sends payload packets to the target communication device by execution of a WRITE function. In step 308, the host communication device sends a data packet that includes TCP/IP headers of 40 or more bytes and a payload. In response to receiving the data packet, in step 310 the target communication device sends an acknowledgement that also includes TCP/IP headers of 40 or more bytes. The host communication device receives payload packets from the target communication device by execution of a READ function. In step 312, the host communication device receives a data packet from the target communication device that includes TCP/IP headers of up 40 or more bytes and a payload, and in step 314 the host communication device sends an acknowledgement that also includes TCP/IP headers of up 40 or more bytes. TCP/IP headers are well-known in the art and will not be described in greater detail except to note that they include the IP addresses and TCP port numbers associated with the two communication devices engaged in the communication.

Upon completion of the exchange of data, the virtual connection is torn down in a four way close (steps 316, 318, 320, and 322) that involves the execution of a CLOSE function by each of the host and target communication devices. In steps 316 and 320, the host and target communication devices respectively send a finish signal to the other device. In response to receiving the finish signals, the host and target communication devices respectively acknowledge the finish signals in steps 318 and 322 and the virtual connection is terminated. Each of the finish signals and responsive acknowledgements includes TCP/IP headers consisting of 40 or more bytes.

Figure 4:
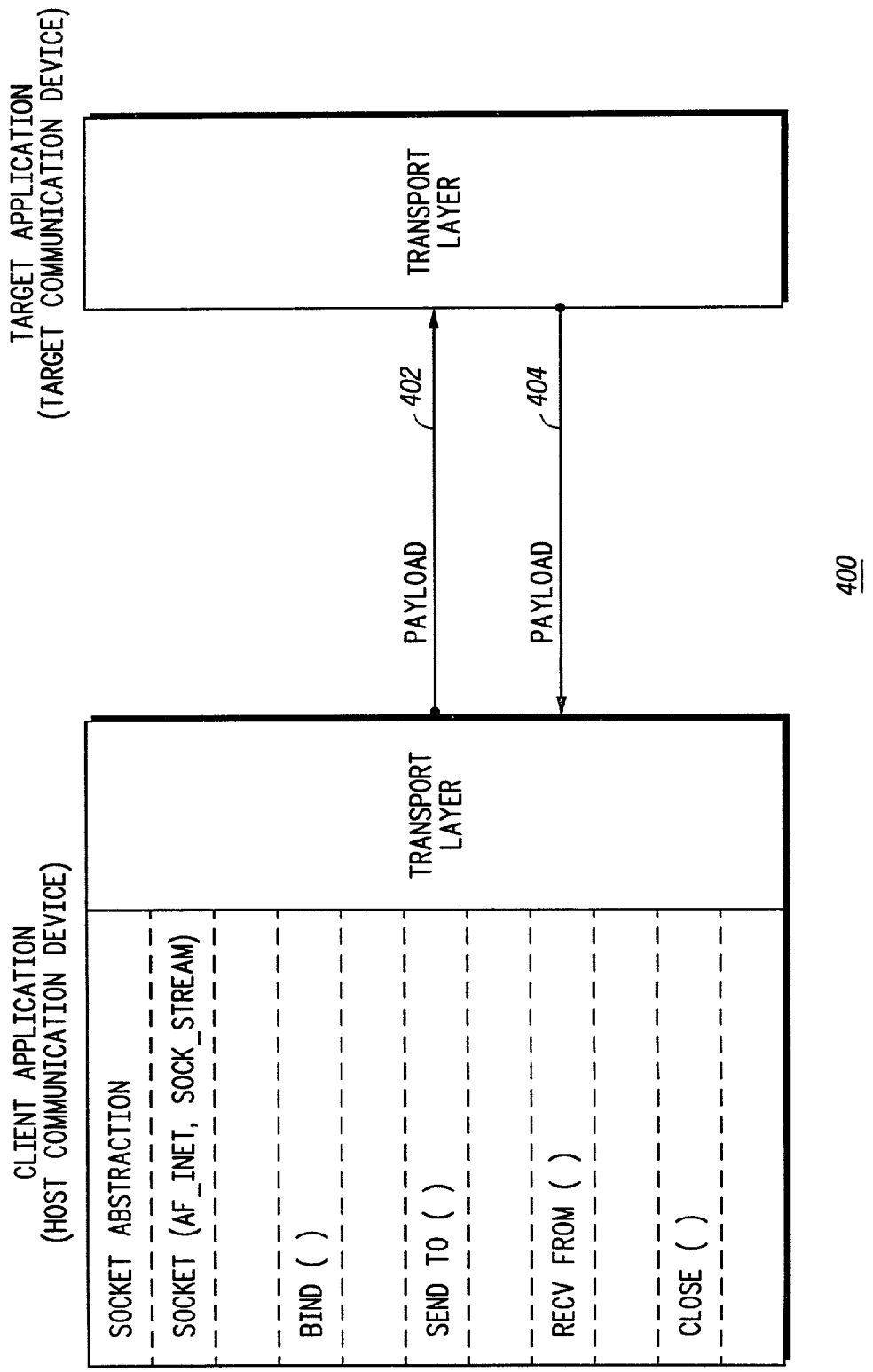
FIG. 4 is a signal flow diagram corresponding to a UDP/IP-based data packet communication of the prior art.

FIG. 4 is a signal flow diagram 400 corresponding to a UDP/IP-based data packet communication of the prior art. UDP/IP is simple and unreliable relative to TCP/IP and does not include the handshake, acknowledgement, and tear down signaling of TCP/IP. Once again, socket abstraction layer 210 establishes a socket for use by the host application when the application issues the socket and bind function calls. The host communication device can then send data by executing a SENDTO function and sending, in step 402, a data packet 402 that includes a UDP/IP header of 28 or more bytes and a payload. In turn, the host communication device may receive data from the target communication device by executing a RECVFROM function, involving receiving a data packet, step 404, that includes UDP/IP headers consisting of 28 or more bytes and a payload. UDP/IP headers are well-known in the art and will not be described in greater detail except to note that they include the IP addresses and UDP port numbers associated with the two communication devices engaged in the communication.

Communication system 100 reduces the overhead incorporated in an exchange of data by redistributing the functions of the socket abstraction layer to a client entity and an agent entity. Communication system 100 redistributes to a agent communication device, preferably Access Gateway 108 or alternatively controller 106 or Base Station 104, at least a portion of the socket abstraction layer functionality residing in a transmitting communication device in the prior art and that would otherwise reside in MS 102 in system 100. By redistributing the socket abstraction layer, at least a portion of the process of generating headers in a mobile unit, such as MS 102, is relocated from the MS to the infrastructure. By relocating at least a portion of the process of generating headers, the overhead consumed in a setting up of a connection between a mobile unit and an infrastructure, a transmission of data, and a tearing down of the connection, is reduced, resulting in an increase in system capacity and improved system efficiency.

Figure 5:
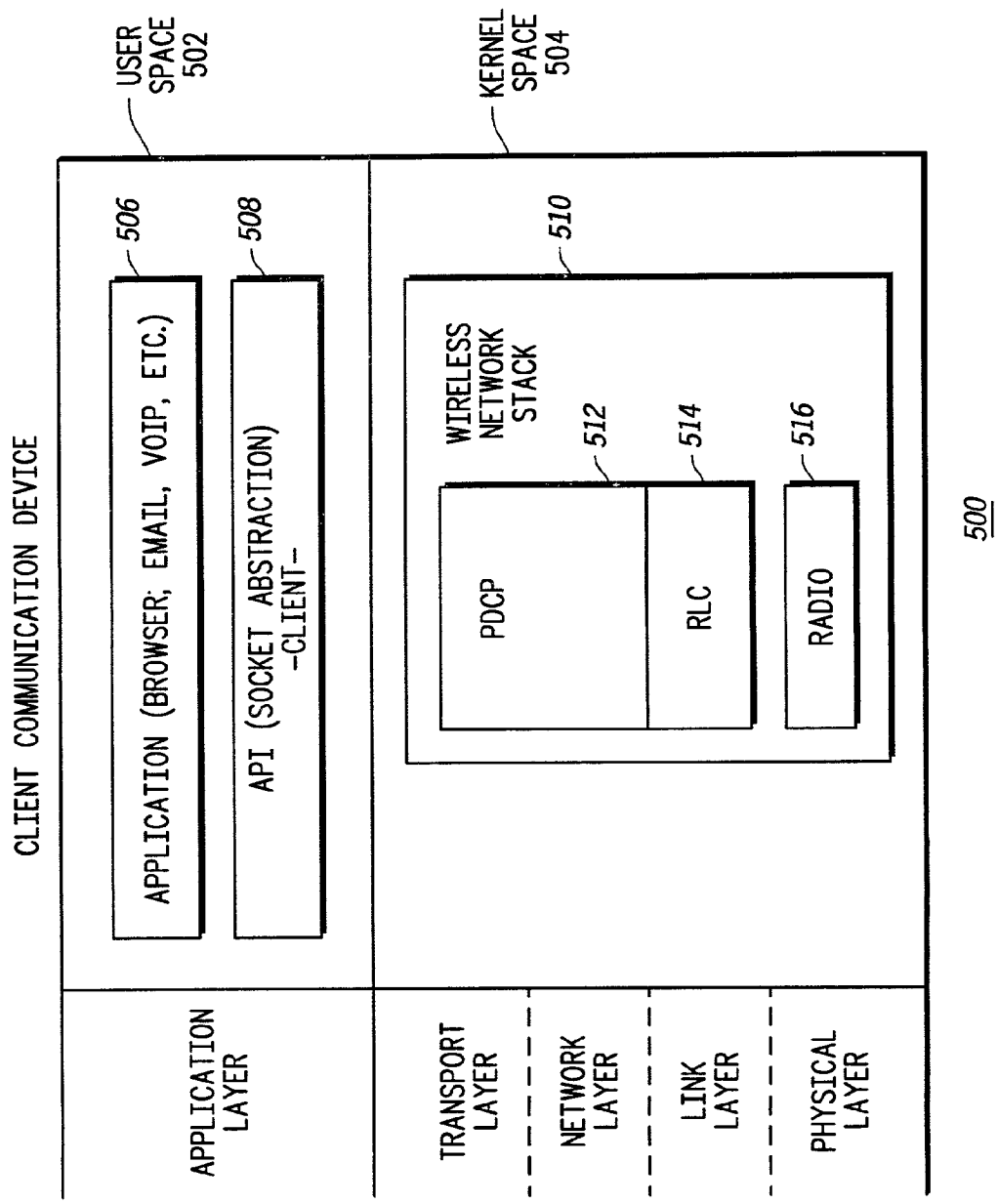
FIG. 5 is a block diagram of a protocol stack of a client communication device in accordance with an embodiment of the present invention.
Figure 6:
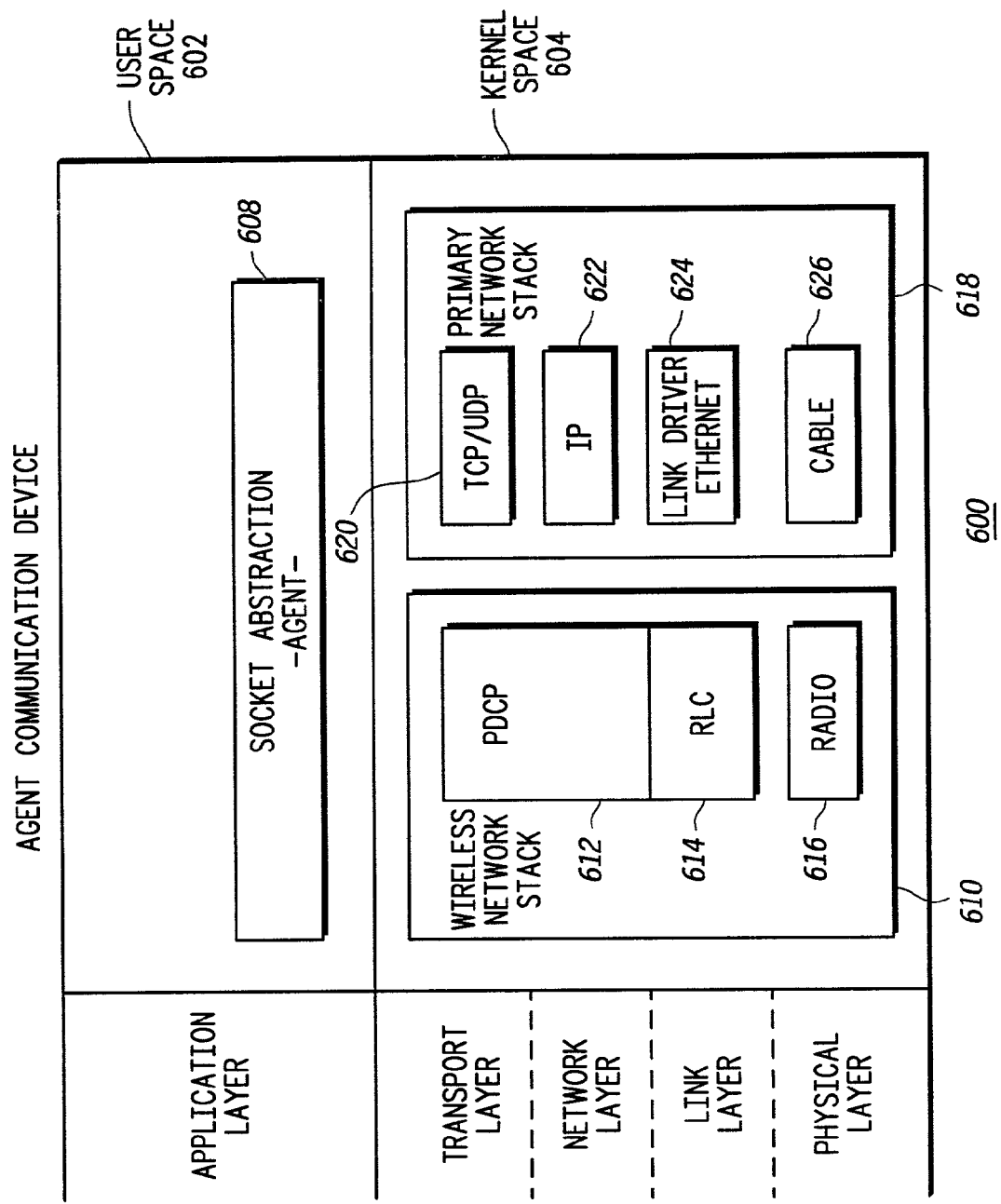
FIG. 6 is a block diagram of a protocol stack of an agent communication device in accordance with an embodiment of the present invention.

FIGS. 5 and 6 are block diagrams of protocol stacks 500, 600 in accordance with an embodiment of the present invention. Protocol stack 500 is a protocol stack of an client communication device, preferably MS 102, and protocol stack 600 is a protocol stack of an agent communication device, preferably Access Gateway 108, or alternatively any other data processing element 104, 106 of infrastructure 112. Each protocol stack 500, 600 is implemented in a processor 118, 124 of the respective communication device 102, 108. As those who are of ordinary skill in the art realize, each of MS 102 and the communication devices included in infrastructure 112, that is, base station 104, controller 106, and Access Gateway 108, is capable of functioning as a client communication device, an agent communication device, or a target communication device in system 100. However, in an alternative embodiment of the present invention wherein payloads and other messages may be exchanged between a client communication device and an agent communication device without the use of any headers, the infrastructure has additional knowledge, such as assigned IP addresses, that does not need to be conveyed to the client communication device, that is, MS 102. In such an alternative embodiment, the agent communication device must be a component of infrastructure 112, that is, components 104, 106, and 108.

The references to MS 102 herein as the client communication device and to Access Gateway 108, or alternatively infrastructure 112, as the agent communication device is merely meant to assist the reader in understanding the principles of the present invention and not intended to limit the invention in any way. Furthermore, although communication system 100 preferably is a wireless communication system, those of ordinary skill in the ml realize that communication system 100 need not be a wireless communication system and may be a communication system employing any link layer technology without departing from the spirit and scope of the present invention.

Protocol stack 500 includes an application layer 502, or a user space, and lower layers 504, or a kernel space. Application layer 502 includes one or more applications 504 and an API 508 such as a socket abstraction client. API 508 implements the same functions as found in the prior art API 208 to provide a common interface to applications 504 and 204. Unlike the prior art, the API 504 does not implement the lower interface to the transport protocols as found in API 208. Instead the API 504 implements a lower interface to an intermediate network layer such as wireless network stack 510. Kernel space 504 includes a wireless network stack 510 further comprising a packet data convergence protocol (PDCP) layer 512, a radio link control (RLC) layer 514, and a radio layer 516, such as a GSM or a CDMA radio layer. Alternatively, wireless network stack 510 may comprise a Radio Link Protocol (RLP) layer in place of PDCP layer 512 and RLC layer 514. PDCP layer 512 manages the set of packet data protocol (PDP) context, which basically correspond to the set of unique flows or socket pairs. Unlike the prior art, kernel space 504 does not include the TCP/IP suite of protocols as found in TCP/UDP 210, IP 212, link driver 214, and physical layer 216.

Protocol stack 600 includes an application layer 502, or a user space, and lower layers 604, or a kernel space. Application layer 602 includes an agent socket abstraction layer 608. Kernel space 604 includes a wireless network stack 610 that includes a PDCP layer 612, a radio link control (RLC) layer 614, and a radio layer 616, such as a GSM or a CDMA radio layer. Alternatively, wireless network stack 610 may comprise a Radio Link Protocol (RLP) layer in place of PDCP layer 612 and RLC layer 614. Kernel space 604 further includes a primary network stack 618 that includes the remaining portions of the TCP/IP protocol stack, namely a transport layer 620 (similar to transport layer 210), a network layer 622 (similar to network layer 212), a link layer 624 (similar to link layer 214), and a physical layer 626 (similar to physical layer 216).

In communication system 100, the functions of socket abstraction layer 208 of the prior art have been distributed between client socket abstraction layer 508 of the client communication device, that is, MS 102, and agent socket abstraction layer 608 of the agent communication device, that is, infrastructure 112 and preferably Access Gateway 108. Client socket abstraction layer 508 is capable of interfacing directly with wireless network stack 510 and provides socket API functionality for application layer 506 in the client communication device, that is, MS 102. In turn, agent socket abstraction layer 608 provides an abstract implementation of the network protocol stack in the agent communication device, that is, infrastructure 112. As a result, the functions of transport layer 210, network layers 212, link layer 214, and physical layer 216 are performed by infrastructure communication device 108 on behalf of communication device 102. The socket API corresponding to socket abstraction layer 508 and the network abstraction layer provided by socket abstraction layer 608 then communicate using interprocess communication (IPC).

Figure 7:
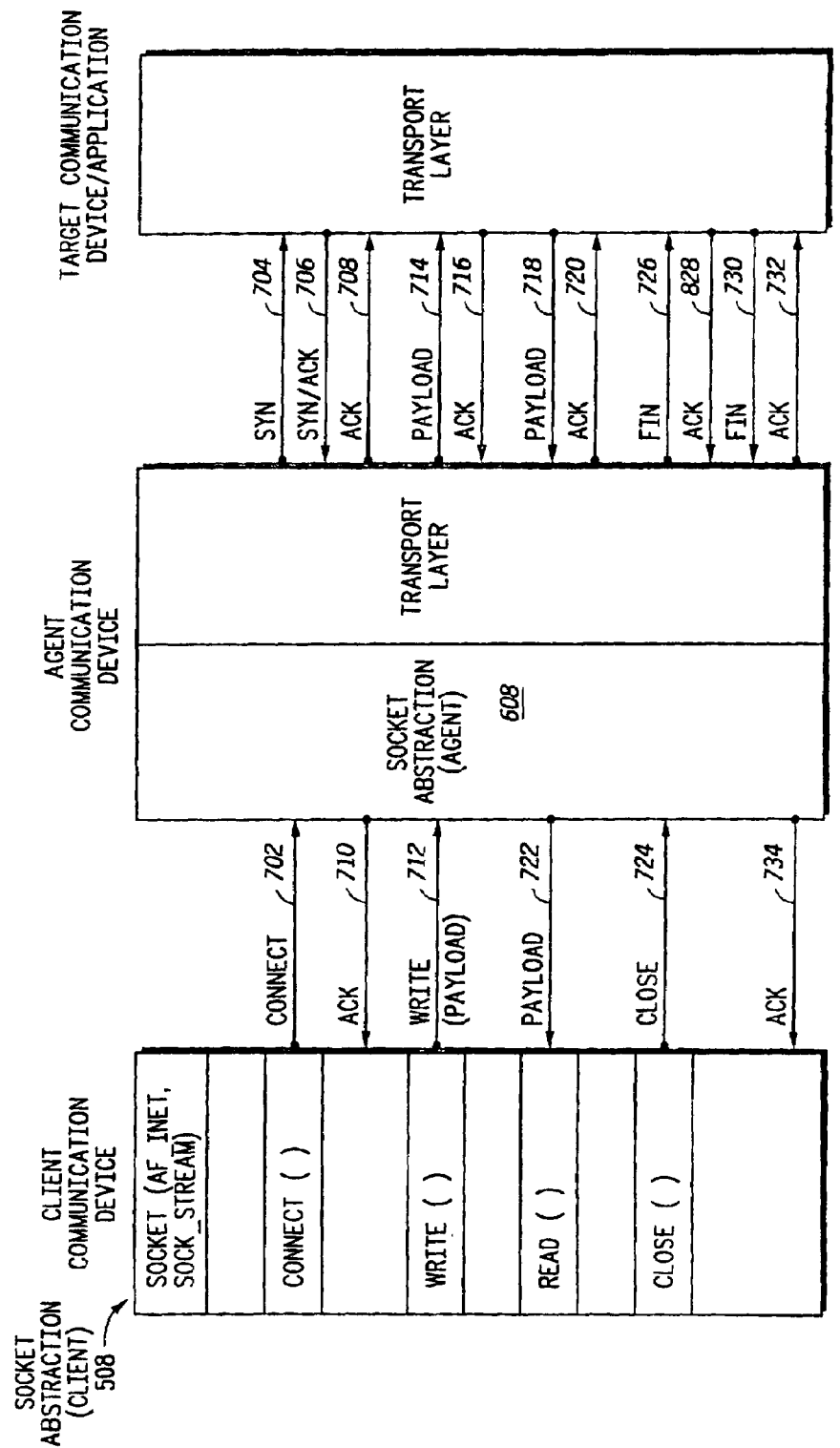
FIG. 7 is a signal flow diagram of a TCP/IP-based data packet communication in accordance with an embodiment of the present invention.

FIG. 7 is a signal flow diagram 700 corresponding to a TCP/IP-based data packet communication in accordance with an embodiment of the present invention. As is apparent from FIG. 7, at least a portion of the prior art signaling that occurred between a host communication device and the fixed infrastructure has been shifted to occurring between various components in the infrastructure. By shifting the signaling to intra-infrastructure communications from communications between a mobile unit and the infrastructure, consumption of bandwidth for over-the-air communications is conserved and communication system capacity (i.e., the number of users that may be served by the system) is increased.

Referring to FIG. 7, a virtual connection is initiated between a client application running on a host communication device, such as MS 102, and an application running on a target communication device, such as DTE 136, by execution of a socket and CONNECT function. Client socket abstraction layer 508 establishes a socket for use by the host application. In step 702, client socket abstraction layer 508 running in the host communication device sends an IPC message, that is, a CONNECT signal, to agent socket abstraction layer 608 in the fixed infrastructure, preferably in Access Gateway 108. The CONNECT signal may includes a protocol indicator, a destination IP address, and a destination TCP port. Agent socket abstraction layer 608 relays the address information that may be included in the connect signal, or be determined from the wireless network stack 610, or be determined from prior configuration information, to transport layer 620 and network layer 622 and the IPC message is translated to a real TCP/IP SYN datagram that includes the 40 byte or more TCP/IP header, that is, a SYN signal, that is conveyed, in step 704, to a network layer interfacing with the target application. In step 706, the target application accepts the connection request by acknowledging the SYN signal and sending a connection request to agent socket abstraction layer 608 in infrastructure 112. In step 708, infrastructure 112 acknowledges the connection request received from the target application. In step 710, socket abstraction layer 608 then sends an acknowledgement, preferably comprising two bits, to MS 102.

MS 102 sends payload packets to the target communication device by execution of a WRITE function. In step 712, MS 102 sends a data packet that does not include the TCP/IP headers to infrastructure 112 via a reverse link traffic channel to communication between MS 102 and the infrastructure. In response to receiving the data packet, agent socket abstraction layer 608 relays the data packet to transport layer 620 and network layer 622. Transport and network layers 620, 622 attach the TCP/IP headers to the payload and convey, in step 714, the payload and associated TCP/IP headers to the network stack associated with the target application. In step 716, the network layer associated with the target application acknowledges the payload, but no such acknowledgement is conveyed to MS 102.

MS 102 receives payload packets from the target application through execution of a READ function. In step 718, the target application sends a TCP/IP datagram that includes a payload to infrastructure agent socket abstraction layer 608. Infrastructure 112, preferably Access Gateway 108 and preferably transport and network layers 620, 622 corresponding to infrastructure socket abstraction layer 608, removes from the data packet any TCP/IP headers that are accompanying the payload. Access Gateway 108 then conveys, in step 722, the payload, minus the TCP/IP headers, to MS 102 via a forward link traffic channel and acknowledges, in step 720, the packet to the transport layer corresponding to the target application.

Upon completion of the exchange of data, the virtual connection is torn down. MS 102 can initiate the tear down by execution of CLOSE function. In step 724, MS 102 sends a close message, preferably comprising one byte, to the infrastructure. Socket abstraction layer 608 receives the close message from MS 102 and, in response to receiving the close message, initiates a four way handshake with the target application and transport layer associated with the target application. As depicted in steps 726 and 730 of FIG. 7, the four way handshake includes agent socket abstraction layer 608 and the socket abstraction layer's associated transport layer exchanging finish signals with the target application and the target application's associated transport layer. In response to receiving the finish signals, socket abstraction layer 608 and the socket abstraction layer's associated transport layer, and the target application and the target application's associated transport layer, respectively acknowledge the finish signals in steps 728 and 730. Socket abstraction layer 608 then conveys an acknowledgement, preferably comprising two bits, to MS 102 in step 734 and the virtual connection is terminated.

Figure 8:
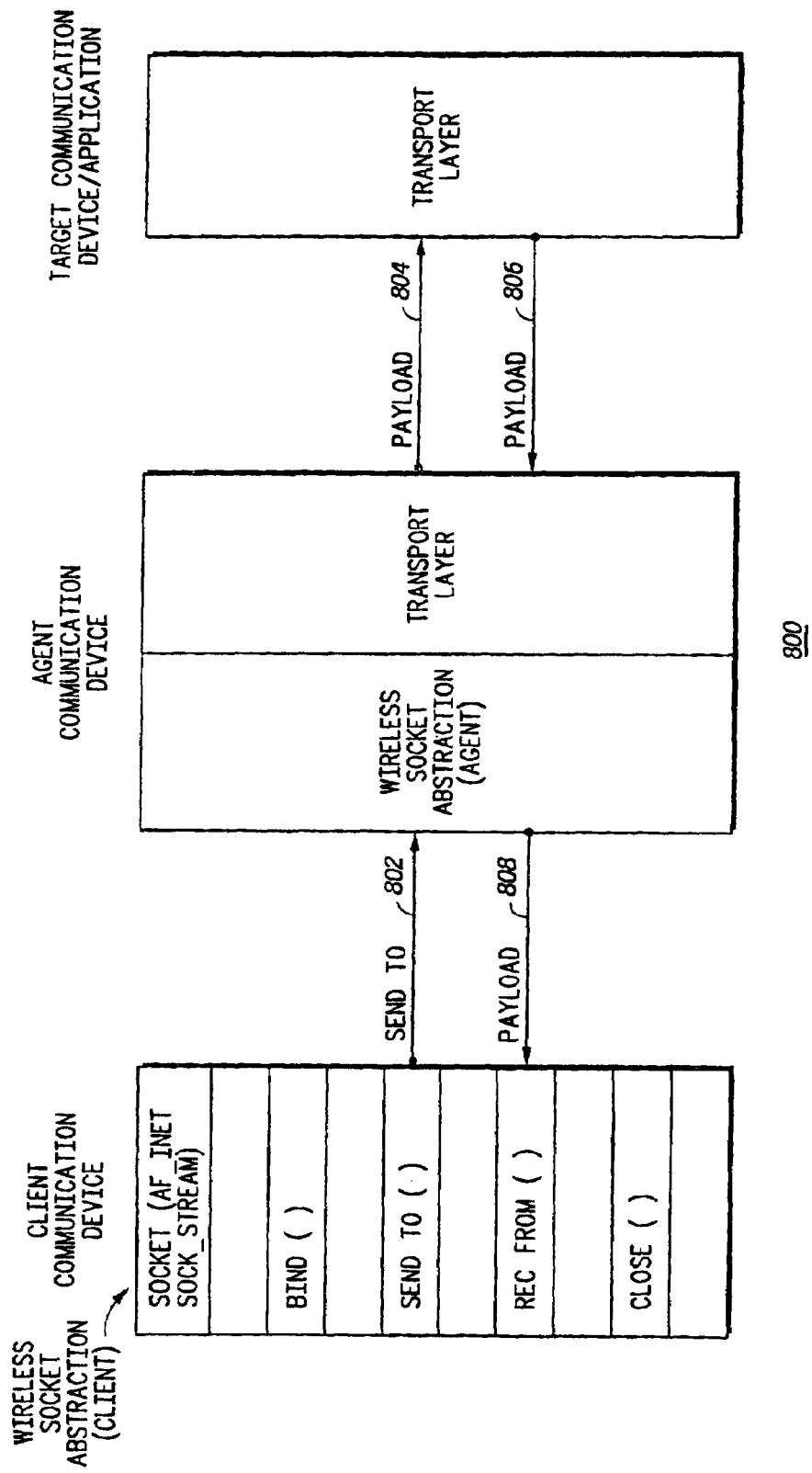
FIG. 8 is a signal flow diagram of a UDP/IP-based data packet communication in accordance with another embodiment of the present invention.

FIG. 8 is a signal flow diagram 800 corresponding to a UDP/IP-based data packet communication in accordance with another embodiment of the present invention. Similar to the TCP/IP signal flow, socket abstraction layer 608 establishes a socket for use by the client application running on a host communication device, such as MS 102. No handshake is required to establish a connection. MS 102 sends payload packets to the target communication device by execution of a SENDTO function. In step 802, MS 102 sends a data packet that preferably includes a seven byte TCP/IP header to infrastructure 112 via a reverse link traffic channel. In response to receiving the data packet, agent socket abstraction layer 608 relays the data packet to transport layer 620 and network layer 622. Transport and network layers 620, 622 attach the unsent TCP/IP headers to the payload and convey, in step 804, the payload and associated TCP/IP headers to the network stack associated with the target application.

MS 102 receives payload packets from the target application through execution of a RECVFROM function. In step 806, the target application sends a TCP/IP datagram that includes a payload to infrastructure agent socket abstraction layer 608. Infrastructure 112, preferably Access Gateway 108 and preferably transport and network layers 620, 622 corresponding to socket abstraction layer 608, removes from the data packet any TCP/IP headers that are accompanying the payload. Access Gateway 108 then conveys, in step 808, the payload, minus the TCP/IP headers, to MS 102 via a forward link traffic channel.

By distributing the functions of socket abstraction layer 210 of the prior art between client socket abstraction layer 508 of MS 102 and agent socket abstraction layer 608 of infrastructure 112, the size of the headers included in data packets wirelessly conveyed between MS 102 and infrastructure 112 is reduced. TCP/IP headers associated with connect request messages, payload containing data packets, acknowledgements, and finish messages, are reduced from 40 bytes in the prior art to preferably seven bytes, zero bytes, two bits, and one byte, respectively. UDP/IP headers associated with the conveyance of a payload from MS 102 to infrastructure 112 are reduced from 28 bytes preferably to seven bytes, and in the case of a conveyance of a payload from infrastructure 112 to MS 102, from 28 bytes preferably to zero bytes. However, those who are of ordinary skill in the art realize that the number of bytes included in the reduced headers may vary depending upon the header protocol used in the design of the system and the information that needs to be conveyed. In another embodiment of the present invention, the TCP/IP headers associated with connect request messages, payload containing data packets, and finish messages, are reduced to zero bytes. By reducing the headers included in an over the air transmission, communication system 100 conserves bandwidth for transmissions relative to the prior art, thereby allowing for increased system capacity and improved system efficiency.

Figures 9, 10:
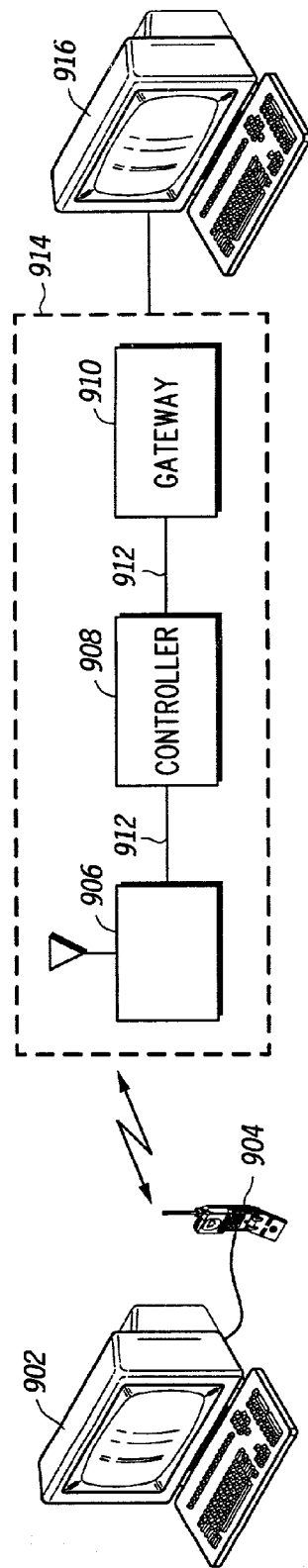
FIG. 9 is a block diagram of a data communication system in accordance with another embodiment of the present invention.
FIG. 10 is a block diagram of protocol stacks associated with the components of the communication system of FIG. 9 in accordance with another embodiment of the present invention.

FIG. 9 is a block diagram of a data communication system 900 in accordance with yet another embodiment of the present invention. As depicted in FIG. 9, an application running on a processor included in a client communication device, that is, data terminal equipment (DTE) 902, such as a personal computer, a workstation, or a fax machine, exchanges data packets with an application running on a processor running on data terminal equipment (DTE) 916 connected, preferably via a data network such as the Internet (not shown), to any one or more of base station 906, communication system controller 908, and Access Gateway 910. Base station 906, controller 908, and Access Gateway 910 are coupled together by a network 912 and together with network 912 are collectively referred to as a fixed infrastructure 914. Alternatively, DTE 916 may also be included in fixed infrastructure 914. DTE 902 wirelessly transmits and receives data packets via a wireless data communication device (DCD) 904 coupled to DTE 902, such as a wireless modem or a radiotelephone or cellular telephone capable of being used as a wireless modem.

FIG. 10 is a block diagram of the protocol stacks 1000 associated with the components of communication system 900 in accordance with the embodiment of the invention as depicted in FIG. 9. As depicted in FIG. 10, DTE 902 includes an application layer 1002, a wireless client socket abstraction layer 1004 below the application layer, and a link driver 1008 that are each below the wireless socket abstraction layer. DCD 904 includes a link driver 1010 on a DTE side of the DCD protocol stack and a PDCP layer 1014 opposite the link driver on a wireless communication side of the DCD protocol stack. The wireless side of DCD 904 further includes a physical layer 1016 below the PDCP layer. DCD 904 further includes a relay 1012 interposed between link driver 1010 and PDCP layer 1014. Relay 1012 takes complete messages from the link driver in the link layer and passes the messages to the PDCP layer in one direction, and then does the reverse for messages being transported in opposite direction. Relay 1012 has knowledge of both the PDCP layer 1014 and the link layer in order to insure message boundaries are maintained. Depending on the link layer, relay 1012 may also perform flow control and buffering.

An agent communication device, that is, Infrastructure 914 and preferably Access Gateway 910, includes a wireless agent socket abstraction layer 1022 that interfaces with a lower layer PDCP layer 1020 on a wireless communication side of the infrastructure and a lower layer network stack 1024 on a network side of the infrastructure. In an alternative embodiment of the present invention, PDCP layer 1014 and PDCP layer 1020 may each be replaced by an RLP layer. In turn, PDCP layer 1020 interfaces with a physical layer 1018 on the wireless communication side of the infrastructure, and network stack 1024 interfaces with a link layer 1026 on the network side of the infrastructure. DTE 914 includes the following layers, in ascending order, a link layer 1028, a network stack 1030, a socket abstraction layer 1032, and an application layer 1034. Similar to communication system 100, the protocol stacks are implemented in a processor that is included in each of the components 902, 904, 906, 908, 910, and 916, of communication system 900.

Similar to the distribution of socket abstraction layer functions described above with respect to socket abstraction layers 508 and 608, the functions that resided in socket abstraction layer 210 of the prior art are distributed among wireless socket abstraction layer 1004 of DTE 902 and wireless socket abstraction layer 1022 of infrastructure 914. In communication system 900, the functions of socket abstraction layer 208 of the prior art have been distributed between client socket abstraction layer 1004 of DTE 902 and agent socket abstraction layer 1022 of infrastructure 914, preferably of Access Gateway 910. Client socket abstraction layer 1004 is capable of interfacing with link driver 1008, and thereby with link driver 1010 and PDCP 1014 of DCD 904 and provides socket API functionality for application layer 1002 in DTE 902. In turn, agent socket abstraction layer 1022 provides an abstract implementation of the network protocol stack in infrastructure 914, preferably Access Gateway 908. As a result, the functions of transport layer 210, network layers 212, link layer 214, and physical layer 216 of the prior art are performed by infrastructure 914 on behalf of DTE 902 and DCD 904. The socket API corresponding to socket abstraction layer 1002 and the network abstraction layer provided by socket abstraction layer 1022 then communicate using interprocess communication (IPC).

Figure 11:
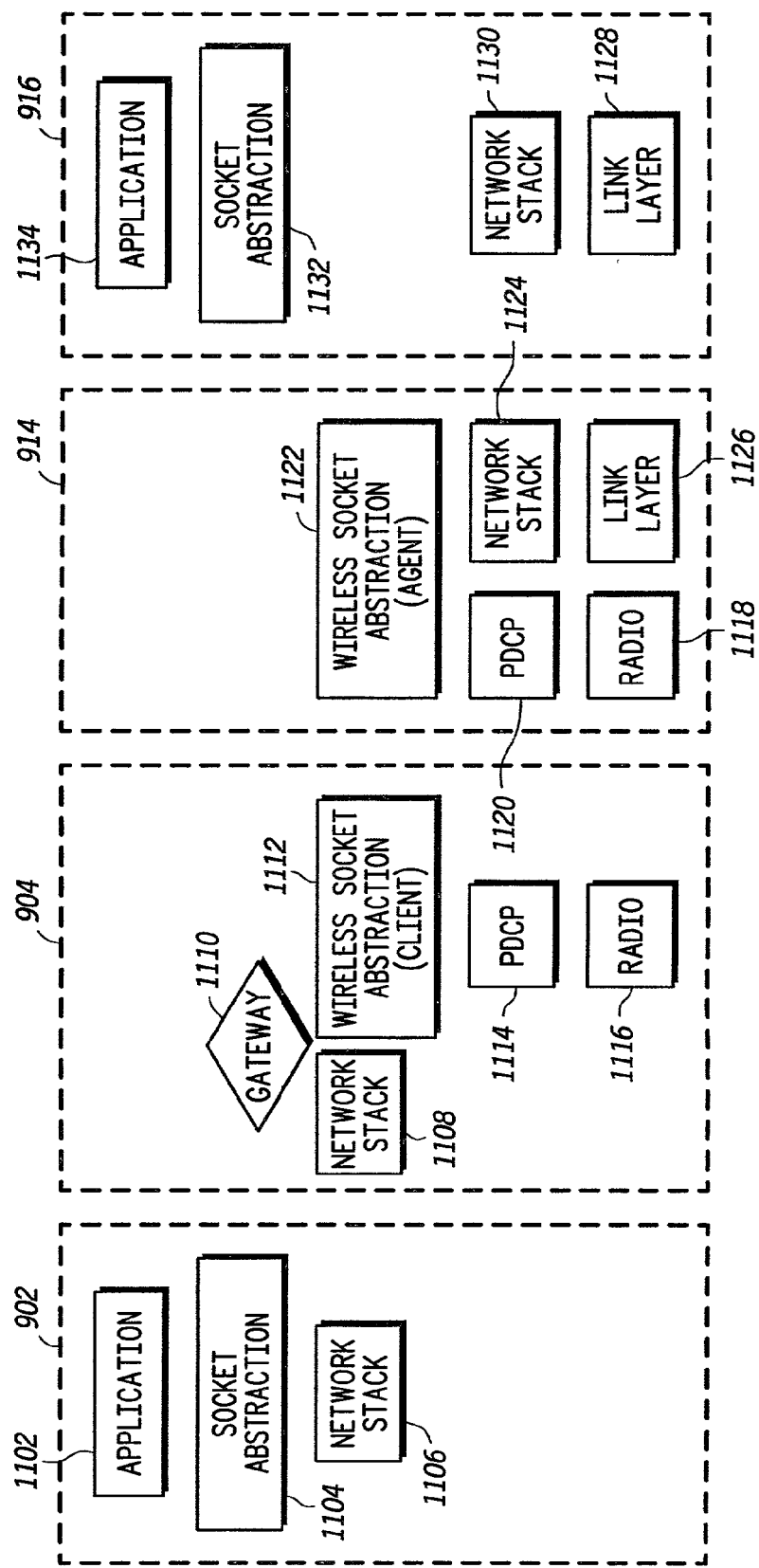
FIG. 11 is a block diagram of protocol stacks associated with the components of the communication system of FIG. 9 in accordance with yet another embodiment of the present invention.

FIG. 11 is a block diagram of the protocol stacks 1100 associated with the components of communication system 900 in accordance with another embodiment of the invention as depicted in FIG. 9, a "gateway" embodiment. In protocol stack arrangement 1100, an operator of communication system 900 cannot provide DTE 902-based software that may be loaded on the DTE in order to facilitate the operation of the DTE in the communication system. As a result, the wireless socket abstraction layer 1004 that is implemented in DTE 902 in protocol stack arrangement 1000 is implemented instead in DCD 904 (i.e., wireless socket abstraction layer 1110), and DCD 904 further includes an implementation of a gateway function 1110. In the "gateway" embodiment, a data packet generated by DTE 902 is passed to DCD 904, where TCP/IP protocols that are added to the data packet by DTE 902 are terminated. The resulting data is then conveyed to socket abstraction layer 1104 in DCD 904 for transport over the air, and endpoint-to-endpoint header transparency is not maintained.

In the "gateway" embodiment of communication system 900, DTE 902 includes an application layer 1102, a socket abstraction layer 1104 below the application layer, and a network stack 1106 below the socket abstraction layer. DCD 904 includes a network stack 1108 on a DTE side of the DCD protocol stack and a wireless socket abstraction layer 1114 opposite the network stack on the wireless communication side of the DCD protocol stack. DCD 904 further includes a PDCP layer 1114 below wireless socket abstraction layer 1114 and a physical layer 1016 below the PDCP layer on the wireless communication side of the DCD protocol stack. DCD 904 further includes a gateway 1110 interposed between network stack 1108 and wireless socket abstraction layer 1114. Gateways such as gateway 1110 are well known in the art available in a variety of forms, such as SOCKS (RFC 1928) or NAT (RFC 1631). Gateway 1110 is any device that terminates one transport or network layer protocol and translates the protocol to another transport or network layer protocol (for example, in the case of NAT, translating IPv4 to IPv6).

Infrastructure 914 includes a wireless socket abstraction layer 1122 that interfaces with a lower layer PDCP layer 1120 on a wireless communication side of the infrastructure and a lower layer network stack 1124 on a network side of the infrastructure. In an alternative embodiment of the present invention, PDCP layer 1114 and PDCP layer 1120 may each be replaced by an RLP layer. In turn, PDCP layer 1120 interfaces with a physical layer 1118 on the wireless communication side of the infrastructure and with a link layer 1124 on the network side of the infrastructure. DTE 916 includes the following layers in ascending order: a link layer 1128, a network stack 1130, a socket abstraction layer 1132, and an application layer 1134.

Similar to the distribution of socket abstraction layer functions described above with respect to socket abstraction layers 508 and 608, the functions of socket abstraction layer 208 of the prior art have been distributed between client socket abstraction layer 1112 of DCD 904 and agent socket abstraction layer 1122 of infrastructure 914, preferably of Access Gateway 910. Client Socket abstraction layer 1112 is capable of interfacing with PDCP 1114 of DCD 904 and provides socket API functionality for application layer 1002 in DTE 902. In turn, agent socket abstraction layer 1122 provides an abstract implementation of the network protocol stack in infrastructure 914, and preferably Access Gateway 908. As a result, the functions of transport layer 210, network layers 212, link layer 214, and physical layer 216 of the prior art are performed by infrastructure 914 on behalf of DTE 902 and DCD 904. The socket API corresponding to socket abstraction layer 1112 and the network abstraction layer provided by socket abstraction layer 1122 then communicate using interprocess communication (IPC).

Once again, a virtual connection between client application 1102 running on DTE 902 and a target application 1134 running on DTE 916 is established, payloads are exchanged between the client application and the target application, and the virtual connection is torn down in accordance with the process described with respect to FIG. 7 for a TCP/IP-based communication and FIG. 8 for a UDP/IP-based communication, except that DTE 902 transmits signals and payloads wirelessly via DCD 904.

By distributing the functions of socket abstraction layer 210 of the prior art between a wireless socket abstraction layer 1004 included in DTE 902 and a wireless socket abstraction layer 1022 included in infrastructure 914 with respect to the embodiment depicted in FIG. 10, or between a wireless socket abstraction layer 1112 included in DCD 904 and the wireless socket abstraction layer included in infrastructure 914 with respect to the embodiment depicted in FIG. 11, the size of the headers included in data packets wirelessly conveyed between DTE 902/DCD 904 and infrastructure 914 is reduced. As detailed above with respect to FIGS. 7 and 8, TCP/IP headers associated with connect request messages, payload containing data packets, acknowledgements, and finish messages, conveyed from an wireless data communication source, that is, DTE 902/DCD 904, to infrastructure 914 and UDP/IP headers associated with the conveyance of a payload from the wireless data communication source to the infrastructure are significantly reduced. By reducing the headers included in an over the air transmission, communication system 900 conserves bandwidth for transmissions relative to the prior art, thereby allowing for increased system capacity and improved system efficiency.

FIGS. 12A and 12B are a logic flow diagram 1200 of the steps executed by communication system 100 in order to engage in a data communication in accordance with another embodiment of the present invention. Logic flow diagram 1200 begins (1202) when a client communication device, such as MS 102, activates (1204) a Packet Data Protocol (PDP) Context Request in accordance with ETSI Technical Specification TS23.060, whereby the client communication device requests access to the Internet. In response to the Context Request, the client communication device is assigned an IP address for use in the data communication. An application running on a processor included in the client communication device opens (1206) a socket specifying an IP and a TCP-based data communication by invoking a SOCKET function. The application then invokes (1208) a CONNECT function by specifying a peer application in a destination device, such as destination device 136, with which the application wishes to communicate, that is, by specifying a destination IP address and a destination TAP port. The wireless socket abstraction layer of the client communication device then passes (1210) a desired Protocol Indicator, the destination IP address, and the destination TCP port to an agent communication device, such as Access Gateway 108, as a connect signal, preferably a TCP SYN signal, using the activated PDCP context.

The agent communication device receives the connect message and routes the connect message to the wireless socket abstraction layer included in the agent communication device. The agent communication device wireless socket abstraction layer converts the connect message into SOCKET and CONNECT function calls. A network stack in the agent communication device then creates (1212) a connect request signal, preferably a TCP SYN signal, and sends (1214) the connect request signal to the specified destination IP address and TCP port, that is, the destination device, to attempt an origination of a socket connection. Assuming the successful conveyance of the SYN packet, a three-way handshake takes place between the agent communication device and the destination device to establish (1216) a virtual connection between the client communication device and the destination device.

The agent communication device then reports (1218) the successful establishment of the connection, that is, completion of the three-way handshake, to the client communication device using an ACK indicator bit. In another embodiment of the present invention, error conditions such as "host server unreachable" could be sent to the client communication device using an escape indicator. The ACK indicator causes the CONNECT function running on the client communication device to return an indicator to the application running on the client communication device. The application then attempts (1220) to send data to the destination device using a WRITE function that identifies a payload being sent by the client communication device. The client communication device then wireless sends (1222) the payload as raw data to the agent communication device. The payload may be segmented if needed, by the radio interface of the client communication device and then sent in segments.

The agent communication device receives (1224) the payload and creates the required TCP packets to transport the payload to destination device 136. The agent communication device then conveys (1226) the TCP packets to the destination device. As TCP ACK's arrive back at the agent communication device, arrive buffer windows of the agent communication device may be adjusted. In another embodiment of the present invention, a flow control mechanism may be implemented between the client communication device and the agent communication device to prevent agent communication device buffer overflow, such as a simple start-stop protocol. However, since the agent communication device interface to a data network, such as the Internet, is typically much faster than the air interface, such flow control is unlikely to be needed.

The agent communication device may then also receive (1228) payloads from the destination device that are intended for the client communication device, which payloads are included in data packets that include TCP/IP headers and/or trailers. As the agent communication device receives the payloads from the destination device, the agent communication device removes (1230) the TCP/IP headers and/or trailers form the data packets and sends (1232) the payload as raw data to the client communication device. The client communication device can then buffer the data until the data is able to be read by the application running on the client communication device. Again, flow control can also be provided between the client communication device and the agent communication device if needed. As the agent communication device receives the data packets from the destination device, the agent communication device creates (1234) TCP ACK's and sends (1236) the ACK's to the destination device as the agent communication device processes the data packets. The application running on the client communication device then attempts (1238) to read the data received from the destination device from the socket opened by the application by using a READ function.

When the communication between the application running on the client communication device and the peer application running on the destination device is over, the application running on the client communication device indicates the close of the session by invoking (1240) the CLOSE function. The socket abstraction layer of the client communication device then sends (1242) a CLOSE message to the agent communication device. The agent communication device then initiates (1244) a four-way TCP close handshake between the agent communication device and the destination device, which four-way TCP close handshake is described above with respect to FIG. 7. Upon completion of the close handshake, the virtual connection between the client communication device and the destination device is terminated (1246), and the logic flow ends (1248). In another embodiment of the present invention, the agent communication device can send (1250) an ACK to the client communication device indicating the success or failure of the close.

Similar to communication systems 100 and 900, the method described by logic flow diagram 1200 provides for increased system capacity and improved system efficiency by reducing the headers included in a transmission between a client communication device and an agent communication device. In order to achieve the overhead reduction and corresponding bandwidth savings, communication systems 100 and 900 distribute the functions of a socket abstraction layer 208 of the prior art, which functions reside in a client communication device, such as a mobile subscriber, in the prior art, between a socket abstraction layer included in an client communication device, such as MS 102 or DTE 902/DCD 904, and a socket abstraction layer in an agent communication device, such as respective serving infrastructures 112 and 914. By so distributing the functions of socket abstraction layer 208, TCP/IP headers may be reduced in signaling between the client communication device and the corresponding agent communication device as part of call set ups and tear downs and in the exchange of payloads between the client and agent communication devices. By reducing the required headers, overhead is reduced and bandwidth is conserved in communications between the client and agent communication devices, such as in over-the-air communications between a mobile subscriber and an infrastructure serving the mobile subscriber, with resulting increases in system capacity and improvements in system efficiency.

While the present invention has been particularly shown and described with reference to particular embodiments thereof, it will be understood by those skilled in the art that various changes may be made and equivalents substituted for elements thereof without departing from the spirit and scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A method for transmitting data by a first communication device, the method comprising steps of:

receiving at the first communication device a message in a socket abstraction layer from a second communication device wherein the message comprises socket information and that requests an establishment of a virtual connection between the second communication device and a destination device based on the socket information, and wherein the socket information comprises destination information without identifying the second communication device;

translating the message requesting an establishment of a virtual connection to a connection request wherein the connection request identifies the second communication device;

routing the connection request from the first communication device to the destination device identified by the socket information, wherein a virtual connection is established between the second communication device and the destination device, based on the connection request;

receiving at the first communication device a data packet from the second communication device wherein the data packet comprises a payload and does not include at least a portion the socket information identifying the destination device;

generating at the first communication device a header in the socket abstraction layer that comprises missing socket information identifying the second communication device;

adding the header to the payload to produce a modified data packet; and routing the modified data packet to the identified destination device.

2. The method of claim 1, wherein the socket information comprises a destination address and a destination port.

3. The method of claim 2, wherein the socket information further comprises a protocol designation.

4. The method of claim 1, wherein the step of adding a header that comprises missing socket information comprises a step of adding a header that corresponds to at least a portion of a TCP/IP (Transmission Protocol/Internet Protocol) suite.

5. The method of claim 1, wherein the generated header is based on one of among a packet data convergence protocol (PDCP) context, a radio link protocol (RLP) context, and configuration information.

6. The method of claim 1, wherein the step of establishing a virtual connection comprises steps of:

receiving from the identified destination device an acknowledgement of the connection request routed to the identified destination device;

receiving a connection request from the identified destination device; and acknowledging the connection request received from the identified destination device.

7. The method of claim 1, wherein the method further comprises steps of:
  receiving at the first communication device a data packet intended for the second communication device, which data packet comprises a payload intended for the second communication device and further comprises a header having socket information which identifies the virtual connection;
  reducing a size of the header to produce a reduced-sized data packet that comprises the payload; and
  routing the reduced-size data packet to the second communication device.

8. The method of claim 1, wherein the message requesting an establishment of a virtual connection comprises an inter-process communication (IPC) message, and wherein the step of translating the message requesting an establishment of a virtual connection to a connection request comprises a step of translating the IPC message to a TCP/IP (Transmission Control Protocol/Internet Protocol) synchronize (SYN) datagram.

9. A method for transmitting data comprising steps of:
  generating, by a first communication device, a message in the socket abstraction layer requesting an establishment of a virtual connection with a destination device identified by socket information, wherein the socket information comprises destination information without identifying the first communication device;
  routing, by the first communication device to a second communication device, the message;
  receiving, by the second communication device, the message;
  translating, by the second communication device, the message requesting an establishment of a virtual connection to a connection request wherein the connection request includes socket information identifying the first communication device;
  routing, by the second communication device, the connection request to the destination device identified by the socket information, wherein a virtual connection is established based on the connection request;
  generating, by the first communication device, a first reduced-size header data packet that comprises a first payload and does not include at least a portion of the socket information identifying the destination device;
  routing, by the first communication device to the second communication device, the first reduced-size header data packet;
  receiving, by the second communication device, the first reduced-size header data packet;
  generating, by the second communication device, a header that includes the missing socket information identifying the first communication device;
  adding, by the second communication device, the header that includes the missing socket information to the payload to produce a modified data packet; and
  routing, by the second communication device, the modified data packet to the identified destination device.

10. The method of claim 9, wherein the method further comprises steps of:
  receiving, by the second communication device, a data packet intended for the first communication device, which data packet comprises a second payload intended for the first communication device and further comprises a header having socket information and;
  reducing, by the second communication device, a size the header to produce a second reduced-size data packet that comprises the second payload; and
  routing, by the second communication device, the second reduced-size data packet to the first communication device.

11. The method of claim 10, wherein the step of reducing a size of the header comprises a step of terminating, by the second communication device, at least a portion of the socket information included in the data packet to produce a second reduced-size data packet that comprises the second payload.

12. A communication device capable of operating in a fixed infrastructure of a wireless communication system, the communication device having a processor capable of receiving a message in a socket abstraction layer from a different communication device, wherein the message comprises socket information and requests an establishment of a virtual connection with a destination device based on the socket information, and wherein the socket information comprises destination information and does not include information identifying the different communication device, translating the message in the socket abstraction layer requesting an establishment of a virtual connection to a connection request wherein the connection request includes information identifying the different communication device, routing the connection request to the destination device identified by the socket information, wherein a virtual connection is established based on the connection request, receiving, from the different communication device, a data packet that comprises a payload and does not include at least a portion of the socket information identifying the destination device, generating a header that comprises missing socket information including information identifying the different communication device, adding the header to the payload to produce a modified data packet, and routing the modified data packet to the identified destination device.

13. The communication device of claim 12, wherein the communication device consists of one of a base station, a system controller, an access gateway, and a data router.

14. The communication device of claim 12, wherein the generated header is based on one of among a packet data convergence protocol (PDCP) context, a radio link protocol (RLP) context or configuration information.

15. The communication device of claim 12, wherein the addition of a header comprises adding headers corresponding to a TCP/IP (Transmission Control Protocol/Internet Protocol) suite.

16. The communication device of claim 12, wherein the establishment of a virtual connection comprises receiving an acknowledgement of the connection request conveyed to the identified destination device, receiving a connection request from the identified destination device, and acknowledging the connection request received from the identified destination device.

17. The communication device of claim 12, wherein the processor is further capable of receiving a data packet intended for the different communication device, which data packet includes socket information associated with a client application running on the different communication device and a payload intended for the client application, reducing a size of the header to produce a reduced-size data packet that comprises the payload, and routing the reduced-size data packet to the different communication device.

18. The communication device of claim 12, wherein the message requesting an establishment of a virtual connection comprises an interprocess communication (IPC) message, and wherein the translation of the message requesting an establishment of a virtual connection to a connection request comprises translating the IPC message to a TCP/IP (Transmission Control Protocol/Internet Protocol) synchronize (SYN) datagram.

19. The communication device of claim 12, wherein an application layer that comprises a socket abstraction layer and a network stack that interfaces with the socket abstraction layer are implemented in the processor, and wherein a transport layer and a network layer of the network stack comprises a packet data convergence protocol (PDCP) layer.

20. The communication device of claim 12, wherein an application layer that comprises a socket abstraction layer and a network stack that interfaces with the socket abstraction layer are implemented in the processor, and wherein the network stack comprises a Radio Link Protocol (RLP) layer.

* * * * *